Figure 1:
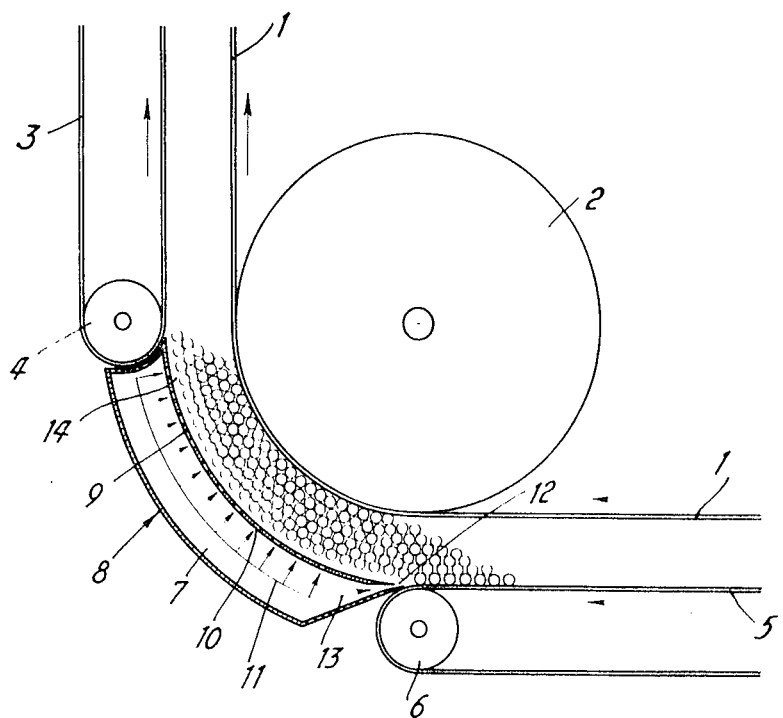

United States Patent

[11] 3,623,598

[72] Inventor Henri Anfossi
  Orleans, Loiret, France
[21] Appl. No. 747,133
[22] Filed July 24, 1968
[45] Patented Nov. 30, 1971
[73] Assignee Service D'Exploitation Industrielle Des Tabacs Et Des Allumettes
  Paris, France
[32] Priority July 25, 1967
[33] France
[31] 115545

[54] GUIDING MEANS FOR CONVEYING ROD-SHAPED OBJECTS AND ESPECIALLY CIGARETTES
  4 Claims, 2 Drawing Figs.
[52] U.S. Cl. .................................................. 198/165,
  198/20 C, 302/2
[51] Int. Cl. ........................................................ B65g 15/14
[50] Field of Search .......................................... 198/165,
  102; 302/20, 28, 29, 31, 35; 271/74

[56] References Cited
UNITED STATES PATENTS

| | | | |
|---|---|---|---|
| 2,261,971 | 11/1941 | Matthews | 271/74 |
| 3,411,829 | 11/1968 | Albright | 271/74 |
| 3,052,339 | 9/1962 | Carter | 302/29 |
| 3,395,943 | 8/1968 | Wilde et al. | 302/31 |
| 3,411,830 | 11/1968 | Smith | 302/31 |

Primary Examiner—Evon C. Blunk
Assistant Examiner—Alfred N. Goodman
Attorney—Sparrow & Sparrow ABSTRACT: A method for ensuring the cohesion of a stream of rod-shaped objects and especially cigarettes comprising a plurality of adjacent layers of the said objects and for permitting the displacement of the said stream by propulsion means which are adapted to produce action solely on one of the two outer layers comprising the step of exerting a pressure of fluid on the other outer layer in the direction of the first of the said layers.

PATENTED NOV 30 1971 3,623,598

Inventor:
HENRI ANFOSSI
By Sparrow and Sparrow
Attorneys

GUIDING MEANS FOR CONVEYING ROD-SHAPED OBJECTS AND ESPECIALLY CIGARETTES

This invention is concerned with improvements in the guiding means which are employed when conveying rod-shaped objects such as cigarettes.

Many of the systems employed for conveying objects of this type consist of endless belts which are disposed either horizontally, at an oblique angle, or even vertically. In the case of horizontal conveyor belts, the objects remain applied against the belts under the action of their own weight. In the case of inclined or vertical belts, the objects can be applied against the belts either under the action of a fluid under pressure exerted in the direction of the conveyor or by means of a simple clamping action, or alternatively by making use of bucket carriers. However, in some zones of the conveying path, the objects cannot be displaced by the belts; this is the case in particular of curved junctions between two straight sections which are inclined with respect to each other or of bridges between two aligned conveyors, for example.

Up to the present time, objects were guided along such zones of the conveying path by means of fixed plates or shells made of metal, for example. However, the objects conveyed were liable to incur damage or even to jam as they passed over the said plates. In the case of cigarettes which are conveyed transversely to their axes, the cigarettes were liable to be displaced crosswise and thus to result in a disordered array or even jamming.

The present invention is intended to overcome this disadvantage. Accordingly, in order to ensure the cohesion of a stream of rod-shaped objects and especially cigarettes made up of a plurality of adjacent layers of the said objects and also in order that the said stream should be conveyed by propulsion means which act solely on one of the two outer layers, it is an aim of the invention to exert a pressure of fluid on the other outer layer in the direction of the first of the said layers at some points of the conveying path such as the zones of the type herein above referred to.

In order to carry out the method outlined above, a further aim of the invention is to provide a device comprising at least one casing which is supplied with gaseous fluid under pressure and which is pierced by apertures for directing jets of fluid onto the oppositely facing layer of objects.

The said casing may be mounted, for example, between two conveyors with which the said layer of objects is in contact both upstream and downstream of the casing and can take up substantially the entire space between the said conveyors so as to form a junction surface between the surfaces of the said conveyors without any appreciable break in continuity.

When the propulsion means which act on the layer which is not subjected to the direct action of the fluid under pressure consist of an endless belt conveyor, the casing surface which is pierced by blowing apertures can be geometrically similar to that of the oppositely facing surface of the carrying run of the said conveyor. Thus, if the carrying run of the first conveyor passes over an idler roller, the said casing surface will be concave and if the conveyor is flat, the said surface will also be flat.

Provision can usefully be made in the upstream edge of the casing for a slit which is so designed that the fluid discharged through the said slit is blown in a direction opposite to the direction of propulsion of objects.

Figure 2:
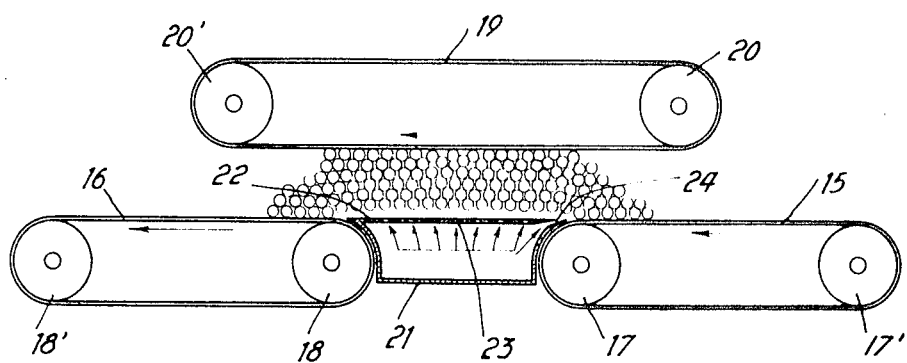

Two examples of application of means according to the invention are shown without any intended limitation in the accompanying drawings, in which:

FIG. 1 is a longitudinal sectional view of a means for guiding along a curved path, and FIG. 2 is a longitudinal sectional view of a "bridge" for guiding between two aligned conveyors.

In the example of FIG. 1, the path followed by the stream of cigarettes is delimited by the endless belt 1 which is guided at right angles by the roller 2, by the outfeed endless belt 3 which passes over the roller 4, by the infeed conveyor belt 5 which passes over the roller 6 and by a blowing element 7 in accordance with the invention. Said element 7 is constituted by a casing 8 having a concave wall 9 which is pierced by apertures 10 and inside which is housed a device 11 for blowing fluid under pressure. The casing 9 is additionally pierced along its upstream edge by a slit 12 through which a jet 13 is discharged in order to lift the cigarettes when they reach the extremity of the conveyor 5.

By virtue of the device which has just been described, the cigarettes are moved away from the wall 9 of the drum 8. The stream as a whole thus becomes coherent and is readily propelled by the convex portion of the belt 1 which only acts on the layer of cigarettes with which it is in contact. The clearance 14 which is created and remains throughout the duration of the conveying operation serves in addition to prevent the cigarettes from coming into contact with a stationary obstacle and from being compressed against the stationary shell. Consequently, the cigarettes which are conveyed in the form of a stream are maintained as an integral mass, even if the cross section of the stream is reduced as a result of irregularity in the supply, for example. The fact that the said mass retains its homogeneous structure without any gaps also prevents the cigarettes which are being conveyed from being displaced crosswise. This feature presents additional advantages in the case of objects which are not wholly cylindrical and in the case of filter-tip cigarettes. The jet 13 which is discharged through the slit 12 also prevents objects from catching as they pass from the belt 5 to the guide element 8.

In the example which is illustrated in FIG. 2, the guiding means in accordance with the invention is interposed between two endless belt conveyors 15, 16 which are mounted on the rollers 17, 17', 18, 18' and disposed in the line of extension of each other. Above the said conveyors, an endless belt 19 which is mounted on the rollers 20, 20' delimits with the said conveyors 15, 16 a duct for conveying cigarettes in bulk.

The element 21 forms a bridge between the infeed and outfeed conveyors 15, 16, and, as in the example of FIG. 1, is made up of a casing which is supplied with fluid under pressure and the top face of which is a plate 22 pierced by apertures 23. The apertures 23 have different orientations: those which are located at the upstream end are directed opposite to the direction of propulsion of the cigarettes whereas those which are located at the downstream end are inflected in the direction of propulsion in order to assist the latter process. These apertures 23 are oriented in such a manner that the jet of fluid is inflected in the direction of propulsion. A slit 24 is formed at the upstream edge of the element 21.

As in the previous embodiment, the bottom layer of cigarettes is lifted under the action of the fluid under pressure which is discharged through the apertures 23 and 24 and the mass of cigarettes which is applied in a coherent manner against the belt 19 passes over the bridge between the conveyors 15 and 16 without frictional contact, with the result that there is no danger of either damage or disordered array.

What I claim is:

1. Apparatus for conveying a plurality of piled-up layers of substantially small, lightweight, rod-shaped articles such as cigarettes in a stream in a direction transverse to their length, including:
    a. an infeed conveyor on one side of said stream;
    b. an outfeed conveyor on the same side of said stream;
    c. a stationary hollow casing having an exterior surface facing and alongside said stream on said one side thereof and extending between said infeed and outfeed conveyors;
    d. a plurality of apertures in said surface along the stream line;
    e. means for applying gas under pressure into said casing and through said apertures transverse to said stream;
    f. belt conveying means spaced from and facing said casing, said conveying means spanning the gap between the infeed and outfeed conveyors and in driving contact with one outer layer of said articles; and
    g. said gas impinging on the other outer layer of said articles forcing the layers toward said conveying means so that the layers are conveyed past said casing in spaced relation to the surface thereof by means solely of said belt conveying means.

2. A device according to claim 1 said casing further comprising, in the upstream edge thereof, a slit disposed for discharging of said gas therethrough, said discharging blowing in a direction opposite to the direction of said transport of said articles.

3. Apparatus as defined in claim 1 wherein said infeed and outfeed conveyors are in the same plane.

4. Apparatus as defined in claim 1 wherein said casing is of concave shape and said belt conveying means has a complimentary curved path and passes over an idler roller.

* * * * *